United States Patent [19]
Takato

[11] Patent Number: 5,701,199
[45] Date of Patent: Dec. 23, 1997

[54] REAL IMAGE MODE VARIABLE MAGNIFICATION FINDER OPTICAL SYSTEM

[75] Inventor: Hideyasu Takato, Hino, Japan

[73] Assignee: Olympus Optical Co., Ltd., Tokyo, Japan

[21] Appl. No.: 655,896

[22] Filed: May 31, 1996

[30] Foreign Application Priority Data

Jun. 1, 1995 [JP] Japan .................. 7-135013

[51] Int. Cl.$^6$ .................. G02B 23/00; G02B 15/14
[52] U.S. Cl. .................. 359/432; 359/422; 359/431; 359/686; 396/379
[58] Field of Search .................. 359/362, 420–422, 359/431–432, 676–678, 686, 708, 771, 781; 396/373–386

[56] References Cited

U.S. PATENT DOCUMENTS

| | | | |
|---|---|---|---|
| 5,173,806 | 12/1992 | Ogata | 359/686 |
| 5,231,534 | 7/1993 | Kato | 359/431 |
| 5,323,264 | 6/1994 | Kato | 359/431 |
| 5,359,377 | 10/1994 | Kamo | 359/676 |

FOREIGN PATENT DOCUMENTS

| | | | |
|---|---|---|---|
| 3-4217 | 1/1991 | Japan . | |
| 4-179908 | 6/1992 | Japan . | |
| 6-118303 | 4/1994 | Japan . | |
| 6-138391 | 5/1994 | Japan | 359/686 |
| 611976A1 | 8/1994 | Japan | 359/432 |

*Primary Examiner*—Thong Nguyen
*Attorney, Agent, or Firm*—Cushman, Darby & Cushman IP Group of Pillsbury Madison & Sutro LLP

[57] ABSTRACT

A real image mode variable magnification finder optical system has a finder objective for forming an optical path different from a photographic objective, an image erecting optical member for erecting an image formed by the finder objective, and an eyepiece having a positive refracting power. The finder objective includes the first lens unit having a negative refracting power, the second lens unit having a positive refracting power, the third lens unit having a negative refracting power, and the fourth lens unit having a negative refracting power, so that the second lens unit and said third lens unit are movable along the optical axis to change spaces among respective lens units from the first lens unit to the fourth lens unit. In this way, the finder optical system is obtained which bears a high variable magnification ratio, but is compact in size and provides good correction for aberration.

13 Claims, 9 Drawing Sheets

SPHERICAL ABERRATION
PUPIL DIA. = 2mm

−1.0 (diop) 1.0

ASTIGMATISM
ω = 25.26°

−1.0 (diop) 1.0

DISTORTION
ω = 25.26°

−10. (%) 10.

SPHERICAL ABERRATION
PUPIL DIA. = 2mm

−1.0 (diop) 1.0

ASTIGMATISM
ω = 16.8°

−1.0 (diop) 1.0

DISTORTION
ω = 16.8°

−10. (%) 10.

SPHERICAL ABERRATION
PUPIL DIA. = 2mm

−1.0 (diop) 1.0

ASTIGMATISM
ω = 7.53°

−1.0 (diop) 1.0

DISTORTION
ω = 7.53°

−10. (%) 10.

SPHERICAL ABERRATION
PUPIL DIA.=2mm

ASTIGMATISM
ω=25.27°

DISTORTION
ω=25.27°

SPHERICAL ABERRATION
PUPIL DIA.=2mm

ASTIGMATISM
ω=16.7°

DISTORTION
ω=16.7°

SPHERICAL ABERRATION
PUPIL DIA.=2mm

ASTIGMATISM
ω=7.2°

DISTORTION
ω=7.2°

SPHERICAL ABERRATION
PUPIL DIA. = 2mm

-1.0 (diop) 1.0

ASTIGMATISM
ω = 25.29°

-1.0 (diop) 1.0

DISTORTION
ω = 25.29°

-10. (%) 10.

SPHERICAL ABERRATION
PUPIL DIA. = 2mm

-1.0 (diop) 1.0

ASTIGMATISM
ω = 16.7°

-1.0 (diop) 1.0

DISTORTION
ω = 16.7°

-10. (%) 10.

SPHERICAL ABERRATION
PUPIL DIA. = 2mm

-1.0 (diop) 1.0

ASTIGMATISM
ω = 7.29°

-1.0 (diop) 1.0

DISTORTION
ω = 7.29°

-10. (%) 10.

SPHERICAL ABERRATION
PUPIL DIA. = 2mm

ASTIGMATISM
ω = 24.98°

DISTORTION
ω = 24.98°

SPHERICAL ABERRATION
PUPIL DIA. = 2mm

ASTIGMATISM
ω = 16.8°

DISTORTION
ω = 16.8°

SPHERICAL ABERRATION
PUPIL DIA. = 2mm

ASTIGMATISM
ω = 7.82°

DISTORTION
ω = 7.82°

REAL IMAGE MODE VARIABLE MAGNIFICATION FINDER OPTICAL SYSTEM

BACKGROUND OF THE INVENTION

1. Field of the Invention

This invention relates to a real image mode variable magnification finder optical system which is chiefly used in a camera incorporating a lens shutter or a still video camera.

2. Description of Related Art

A virtual image mode finder optical system has long been known as a finder optical system which is provided independently of a photographing optical system in a camera. This finder optical system, however, has problems that when a variable magnification ratio is increased, the diameter of a front lens must be made large and that it is difficult to clearly identify the entire field because a field frame is hard to see. In contrast to this, a real image mode finder optical system is such that since an entrance pupil can be placed in the forward direction of the optical system, the front lens with a smaller diameter is satisfactory. Moreover, this optical system, because an image formed by an objective system is observed through an eyepiece, has no problem that it is difficult to identify the entire field as mentioned above. For this reason, such real image mode optical systems have come into prominent use in cameras equipped with built-in lens shutters having variable magnification functions in which there have lately been a rapid increase in use.

For the real image mode finder optical system mentioned above, the optical systems of two- or three-lens unit zoom type have been proposed as those each having a variable magnification ratio of approximately 2. The optical systems of such zoom type, however, are such that when the variable magnification ratio is increased, the behavior of lenses for changing the magnification of the optical system is extended, and thus the refracting power of each lens unit becomes strong. Since in particular the refracting power of each lens unit playing a part for changing the magnification is increased, there is considerable variation in aberration when the magnification is changed, and the amount of production of aberration in this lens unit is increased. In the optical systems of such zoom type, because the number of lens units is small, it is extremely difficult to correct for aberration produced. Furthermore, the amount of movement of each lens unit in changing the magnification becomes large, and hence there is the problem that the entire length of the objective system increases, resulting in oversizing of the finder.

These difficulties are solved by using the real image mode finder optical system of four-lens unit zoom type. According to this zoom type, the behavior of lenses for changing the magnification and correction for aberration can be properly shared among individual lens units. Moreover, if a first lens unit closest to an object, of four lens units, is designed to have a negative refracting power, the back focal-distance of the objective system can be lengthened. This is very advantageous to the case where part of an image inverting member is contained in the objective system. Optical systems thus constructed so that the variable magnification ratio is 2 or more and the four lens units have, in order from the object side, negative, positive, negative, and positive refracting powers are known, for example, by Japanese Patent Preliminary Publication Nos. Hei 3-4217, Hei 4-179908, Hei 6-109974, and Hei 6-118303.

However, in the optical system, although of four-lens unit zoom type, designed so that individual lens units have negative, positive, negative, and positive refracting powers as mentioned above, it is considerably difficult that the variable magnification ratio as high as 3 or more is made compatible with compact design of the finder. Specifically, the optical system set forth in Hei 3-4217 is such that the variable magnification ratio is as high as 2.75, but the number of lenses of the objective system is so large that its entire length increases, with a resulting oversized finder. Further, the optical systems set forth in Hei 4-179908, Hei 6-109974, and Hei 6-118303 are such that although the number of lenses of the objective system is small enough for compactness, the variable magnification ratio is as low as 2, which is unsatisfactory.

SUMMARY OF THE INVENTION

It is, therefore, an object of the present invention to provide a real image mode variable magnification finder optical system of compact design in which although the variable magnification ratio is as high as 3 or more, the entire length of the objective system is relatively short, and aberration is favorably corrected.

In order to achieve this object, the real image mode variable magnification finder optical system of the present invention includes a finder objective for forming an optical path different from a photographic objective, an image erecting optical member for erecting an image formed by the finder objective; and an eyepiece having a positive refracting power. The finder objective includes, in order from the object side, a first lens unit having a negative refracting power, a second lens unit having a positive refracting power, a third lens unit having a negative refracting power, and a fourth lens unit having a negative refracting power so that, at least, the second and third lens units can be moved along the optical axis to change individual spaces among the first to fourth lens units.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 8A, 8B, and 8C are diagrams showing aberration characteristics at the wide-angle position of the finder optical system of the second embodiment;

DETAILED DESCRIPTION OF THE PREFERRED EMBODIMENTS

Figure 1:
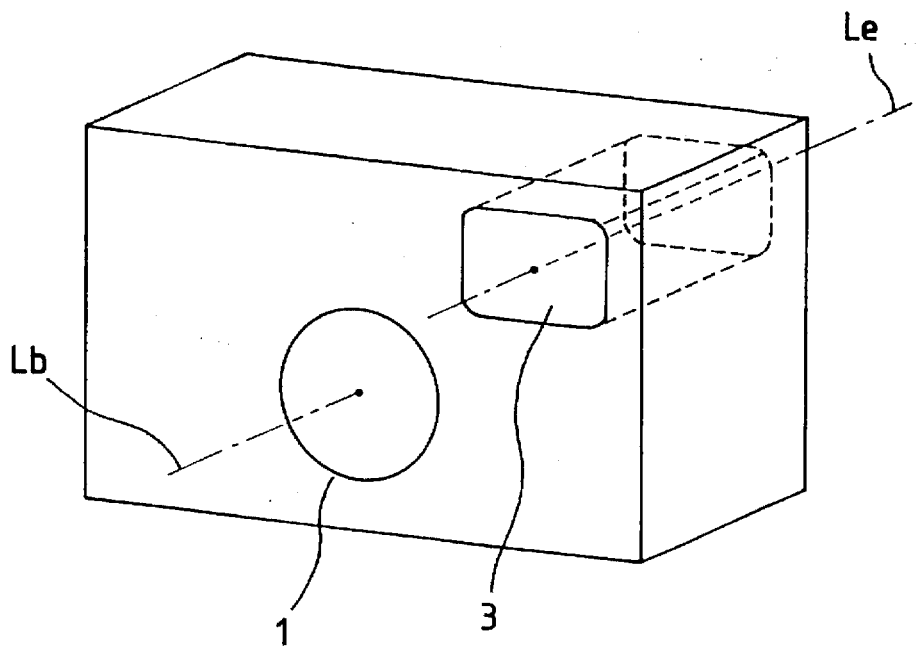
FIG. 1 is a perspective view showing a compact camera to which the real image mode variable magnification finder optical system of the present invention is applied.

Before undertaking the description of the embodiments, it will be expedient to explain the function of the real image mode variable magnification finder optical system according to the present invention.

In general, as the variable magnification ratio of the finder is increased, lens units having the behavior of lenses for changing the magnification of the finder must have strong refracting powers, and the amount of production of aberration In these lens units becomes large. If the objective system of the finder optical system having such a high variable magnification ratio is constructed with two or three lens units, aberration produced in any lens unit playing a part for changing the magnification as mentioned above cannot be completely corrected by other lens units. The present invention, because the objective system is composed of four lens units, brings about a finder in which aberration is completely corrected by lens units other than those for changing the magnification, aberrations are favorably corrected, the variation of aberration caused in changing the magnification is slight, and unfavorable phenomena are not produced In all areas of variable magnification.

In the finder optical system with a high variable magnification ratio, the amount of movement of each lens unit in changing the magnification becomes so large that it is unavoidable that the entire length of the objective system increases. In the present invention, since the fourth lens unit of the objective system has a negative refracting power, the objective system constitutes a telephoto type as a whole, which facilitates a reduction of the entire length. Additionally, if each lens unit is constructed with one or two lenses, the length of the objective system can be further reduced.

Furthermore, In the present invention, in which the fourth lens unit has a negative refracting power, it is possible to diminish its lens diameter. In the case of the objective system whose lens units are arranged, from the object side, for example, to be negative, positive, and negative, or negative, positive, negative, and positive, the height of an off-axis ray increases in the second lens unit at the telephoto position, and the lens diameter inevitably becomes large. In the present invention, the arrangement of lenses having negative, positive, negative, and negative powers makes it possible to bring the entrance pupil in the forward direction of the optical system and reduce individual lens diameters.

As mentioned above, the present invention can provide the real image mode finder optical system which bears a high variable magnification ratio, but is suitable for compact design.

In the real image mode finder optical system with a high variable magnification ratio, correction for coma at the telephoto position of the optical system becomes difficult as the variable magnification ratio is increased. In order to overcome this difficulty by the present invention, it is only necessary to shape at least one surface of the first or second lens unit of the objective system into an aspherical form. The production of spherical aberration and coma can thus be suppressed. The space between the first and second lens units is narrow at the telephoto position and, even though any surface of these lens units is configured to be aspherical, a similar effect will be secured. This configuration is peculiarly effective for correction for coma. If the angle of view is increased at the wide-angle position, thereby reducing the entire length of the objective system, the refracting power of the first lens unit will be enhanced and aberrations will be deteriorated. However, if an aspherical surface is introduced into the first lens unit, the shift of the off-axis ray at the wide-angle position can be compensated. In this way, when the effect of the aspherical surface is well utilized, the finder optical system of good performance can be secured, for example, even though the first lens unit is constucted with a single lens having a high refracting power. For the objective system including the first lens unit having a negative refracting power, although negative distortion is yielded in the first and second lens units at the wide-angle position, an effect on correction for this will be brought about if the entrance surface of the second lens unit is configured as an aspherical one.

The objective system in the present invention is such that when the magnification is changed, the second lens unit mainly bears the behavior of changing the magnification and the third lens unit makes correction for diopter. In this case, the second lens unit is such that as the variable magnification ratio is increased, the refracting power becomes high and the amount of production of aberration increases. In order to improve aberration while having some degree of refracting power, it is desirable that the second lens unit is constructed with at least two lenses to distribute the refracting power. In doing so, the refracting power of each lens can be lessened to decrease the amount of production of aberration, and the second lens unit can be provided with a high refracting power as a whole. Thus, it becomes easy to secure a finder with a high variable magnification ratio of high performance.

Furthermore, the present invention can be designed so that part of the image inverting member is contained in the objective system. Specifically, it is considered that the fourth lens unit is constructed integral with a prism or the prism is situated behind the fourth lens unit. Since such placement of the prism means that air space existing in the absence of the prism is replaced by the prism, the optical path length is increased accordingly, and the back focal distance of the objective system can be extended. This is advantageous to the insertion of a plurality of reflecting surfaces. Hence, when the part of the image inverting member is contained in the objective system, the apparent length of the finder can be reduced, depending on the arrangement of the reflecting surfaces. The result is that the thickness of a camera can be made small.

Also, in the above case, when the fourth lens unit and the prism are integrally constructed, the lens thickness of the fourth lens unit need not be considered, and thus the thickness of the finder can easily be made small. Additionally, the number of parts can be lessened, which is advantageous to costs.

On the other hand, where the prism is placed separate from the fourth lens unit, all the lens units become movable, thus facilitating the behavior of lenses for changing the magnification and compensation for diopter. In particular, when the fourth lens unit is composed of a single lens, the curved surface of lens increases by one compared with the case where the fourth lens unit and the prism are integrally constructed. Thus, the number of degrees of freedom for correction for aberration is increased and the finder of better performance can be obtained.

Because the objective system in the present invention is of four-lens unit zoom type, the magnification is changed in such a way as to vary spaces between the first and second lens units, the second and third lens units, and the third and fourth lens units. That is, the magnification change and compensation for diopter are made by moving at least two of the four lens units. Where three of the four lens units are made movable compared with the case of the movement of two lens units, the variation of aberration caused in changing the magnification can be effectively absorbed, which is advantageous to the optical system with a high variable magnification ratio.

In accordance with the drawings, the embodiments of the real image mode variable magnification finder optical system will be explained in detail below.

First Embodiment

Figure 2:
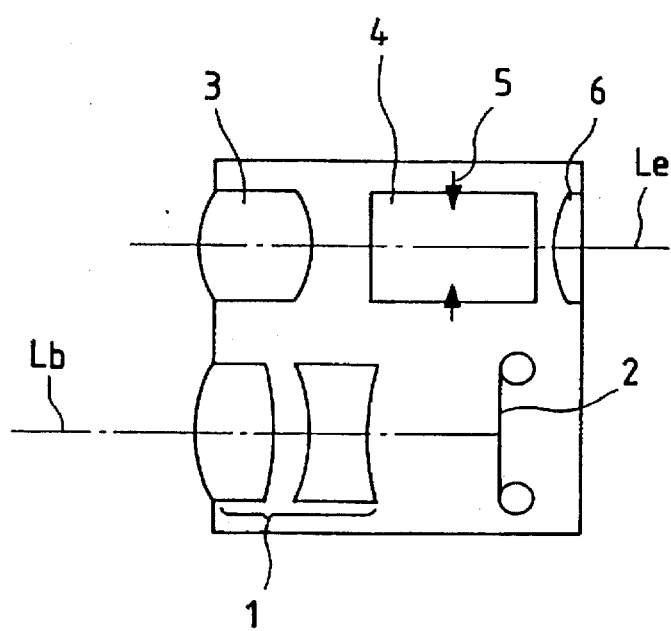
FIG. 2 is a sectional explanatory view showing the entire optical system of the compact camera of FIG. 1.

Using FIGS. 1 and 2, reference is first made to the optical system of a compact camera to which the present invention is applicable. As seen from these figures, a photographing optical path Lb and a finder optical path Le are parallel with each other, and an image of an object is formed on a film 2 by a photographic objective 1 on the one hand, and on the other hand, is observed through a finder composed of a finder objective 3, an image erecting prism 4, a stop 5, and an eyepiece 6. The present invention is thus directed to a finder optical system designed to have the finder objective 3 provided independently of the photographic objective 1.

Figure 3A:
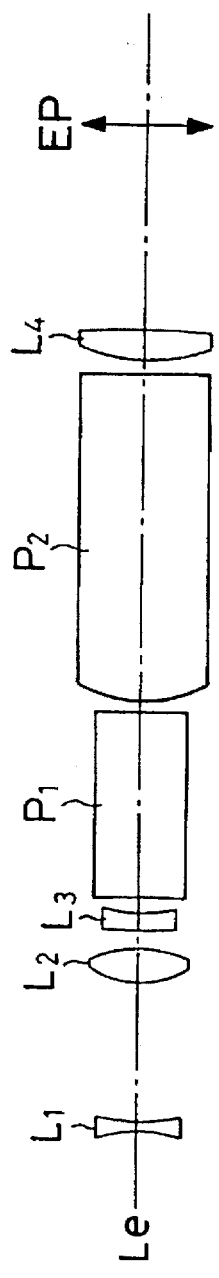
FIGS. 3A, 8B, and 3C are sectional views showing arrangements, developed along the optical axis, at wide-angle, middle, and telephoto positions, respectively, of the finder optical system of a first embodiment in the present invention.
Figure 3B:
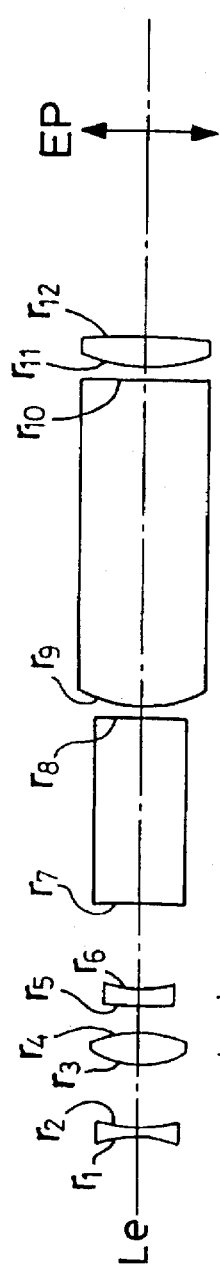
Figure 3C:
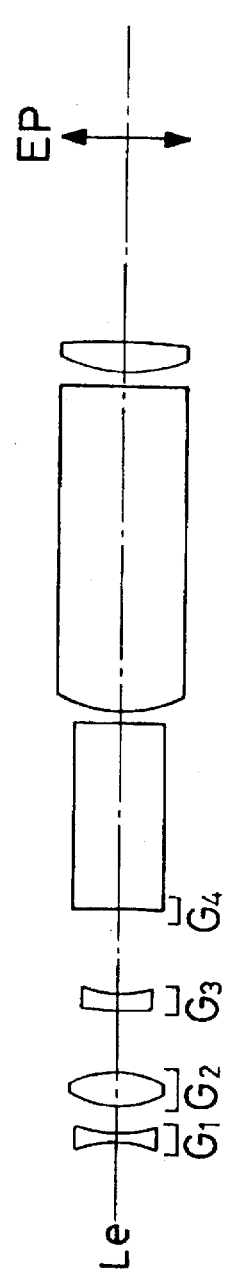
Figure 4A:
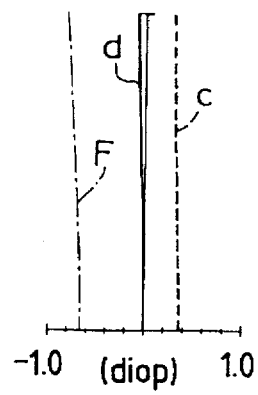
FIGS. 4A, 4B, and 4C are diagrams showing aberration characteristics at the wide-angle position of the finder optical system of the first embodiment.
Figure 4B:
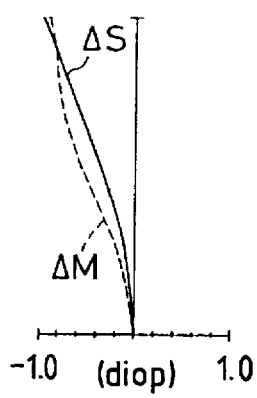
Figure 4C:
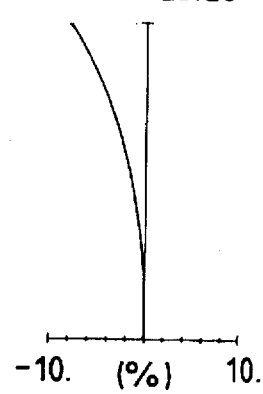
Figure 5A:
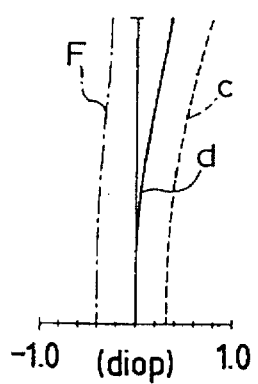
FIGS. 5A, 5B, and 5C are diagrams showing aberration characteristics at the middle position of the finder optical system of the first embodiment.
Figure 5B:
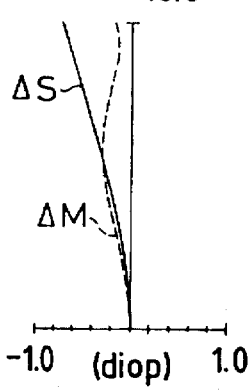
Figure 5C:
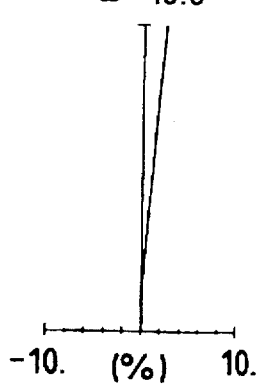
Figure 6A:
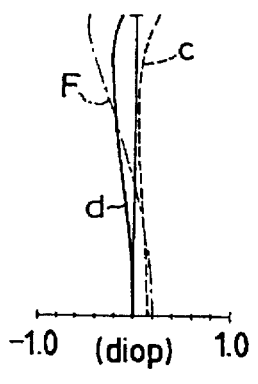
FIGS. 6A, 6B, and 6C are diagrams showing aberration characteristics at the telephoto position of the finder optical system of the first embodiment.
Figure 6B:
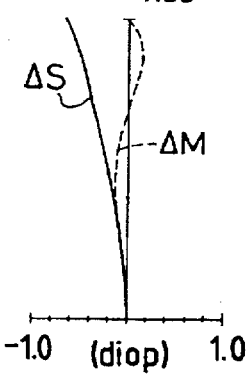
Figure 6C:
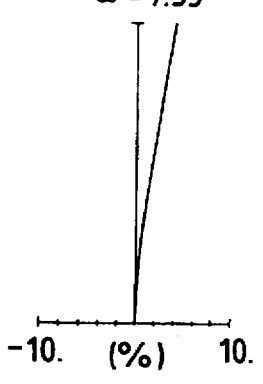

In the first embodiment, as shown in FIGS. 3A, 3B, and 3C, the objective system includes a first lens unit G1 having a negative refracting power, a second lens unit G2 having a positive refracting power, a third lens unit G3 having a negative refracting power, and a fourth lens unit G4 having a negative refracting power. Each of these lens units is constructed with a single lens. The first, second, and third lens units G1, G2, and G3 are represented by lenses L1, L2, and L3, respectively, and the fourth lens unit G4 is constructed integral with a first prism P1 so that its entrance surface has a lens function. Also, reference symbol L4 denotes an eyepiece and EP denotes an eyepoint. An image produced by the objective system is formed close to the entrance surface of a second prism P2, which plays the role of a field lens. The magnification change is made by moving the second and third lens units G2 and G3, and the first and fourth lens units G1 and G4 are fixed.

An example of numerical data in the optical system of the first embodiment is shown below. Also, FIGS. 4A–4C, 5A–5C, and 6A–6C show aberration characteristics of the optical system of the first embodiment. The equation and symbols shown in the following are applied to all the embodiments of the present invention.

The configuration of the aspherical surface is expressed by $$X = CY^2/\{1 + \sqrt{(1-PC^2Y^2)}\} + EY^2 + FY^6 + GY^8 + HY^{10}$$

where X is the coordinate in the direction of the optical axis Y is the coordinate in the direction normal to the optical axis, C is the curvature (i/r, where r is the paraxial radius of curvature) at the vertex of the aspherical surface, and P, E, F, G, and H are aspherical coefficients.

For other symbols, $\omega$ is the half angle of view of incidence (°); EP is the eyepoint (mm); m is the finder magnification; $r_1, r_2, \ldots$ are radii of curvature (mm) of individual lens or prism surfaces; $d_1, d_2, \ldots$ are thicknesses of individual lenses or spaces therebetween; $n_1, n_2, \ldots$ are refractive indices of individual lenses at a wavelength of 587.56 nm; and $v_1, v_2, \ldots$ are Abbe's numbers of individual lenses.

Numerical data $\omega = 25.26 - 7.53°$, EP = 18.52, m = 0.4 – 1.25

| | | | |
|---|---|---|---|
| $r_1 = -10.601$ (aspherical) | | | |
| | $d_1 = 1$ | $n_1 = 1.58423$ | $v_1 = 30.49$ |
| $r_2 = 13.673$ | | | |
| | $d_2 = 12.52$ (wide-angle), 5.69 (middle), 2.45 (telephoto) | | |
| $r_3 = 6.911$ (aspherical) | | | |
| | $d_3 = 2.96$ | $n_3 = 1.5254$ | $v_3 = 56.25$ |
| $r_4 = -8.185$ (aspherical) | | | |
| | $d_4 = 1.61$ (wide-angle), 2.39 (middle), 5.69 (telephoto) | | |
| $r_5 = 78.215$ | | | |
| | $d_5 = 1.5$ | $n_5 = 1.58423$ | $v_5 = 30.49$ |
| $r_6 = 9.56$ (aspherical) | | | |
| | $d_6 = 1.4$ (wide-angle), 7.46 (middle), 7.39 (telephoto) | | |
| $r_7 = -85.47$ (aspherical) | | | |
| | $d_7 = 16.5$ | $n_7 = 1.5254$ | $v_7 = 56.25$ |
| $r_8 = \infty$ | | | |
| | $d_8 = 1$ | | |
| $r_9 = 11.665$ | | | |
| | $d_9 = 29.5$ | $n_9 = 1.5254$ | $v_9 = 56.25$ |
| $R_{10} = \infty$ | | | |
| | $d_{10} = 1.26$ | | |

-continued $\omega = 25.26 - 7.53°, EP = 18.52, m = 0.4 - 1.25$ $r_{11} = 14.195$
$\quad d_{11} = 2.59 \quad n_{11} = 1.5254 \quad \nu_{11} = 56.25$
$r_{12} = -48.597$
(aspherical)

Aspherical Coefficients

First Surface

P=1,
B=4.2699×10$^{-4}$, F=7.5877×10$^{-6}$,
G=−2.6301×10$^{-6}$, H=1.4955×10$^{-7}$

Third Surface

P=1,
B=−7.1635×10$^{-4}$, F=1.8507×10$^{-6}$,
G=9.1221×10$^{-8}$

Fourth Surface

P=1,
B=6.2095×10$^{-4}$, F=3.5155×10$^{-7}$,
G=−4.2769×10$^{-9}$, H=1.1639×10$^{-8}$

Sixth Surface

P=1,
B=2.278×6.8879×10$^{-6}$,
G=5.4519×10$^{-7}$

Seventh Surface

P=1,
B=−3.9989×10$^{-4}$, F=5.1943×10$^{-5}$,
G=−3.2392×10$^{-6}$, H=1.007×10$^{-7}$

Twelfth Surface

P=1,
B=2.1665×10$^{-5}$, F=5.1498×10$^{-6}$,
G=−1.7691×10$^{-7}$, H=2.4583×10$^{-9}$

Second Embodiment

Figure 7A:
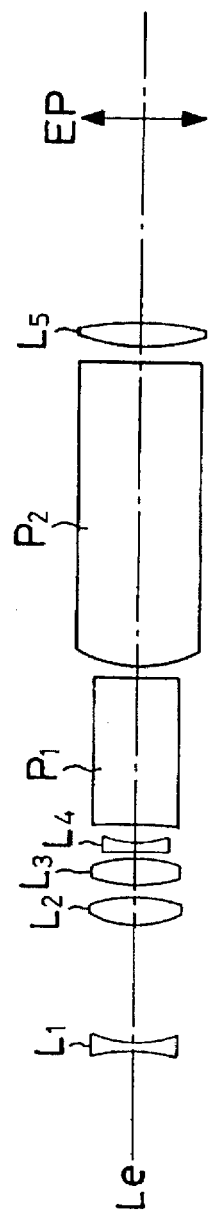
FIGS. 7A, 7B, and 7C are sectional views showing arrangements, developed along the optical axis, at wide-angle, middle, and telephoto positions, respectively, of the finder optical system of a second embodiment in the present invention.
Figure 7B:
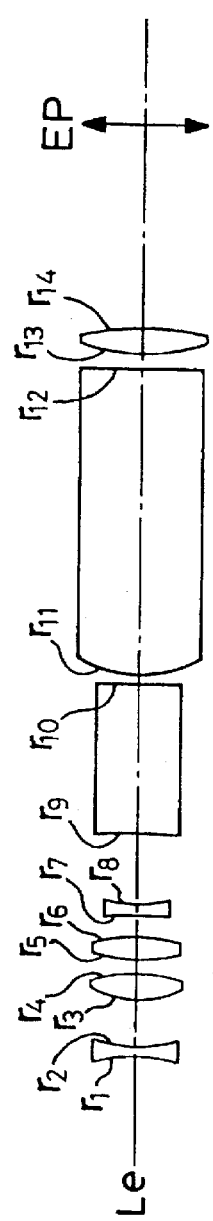
Figure 7C:
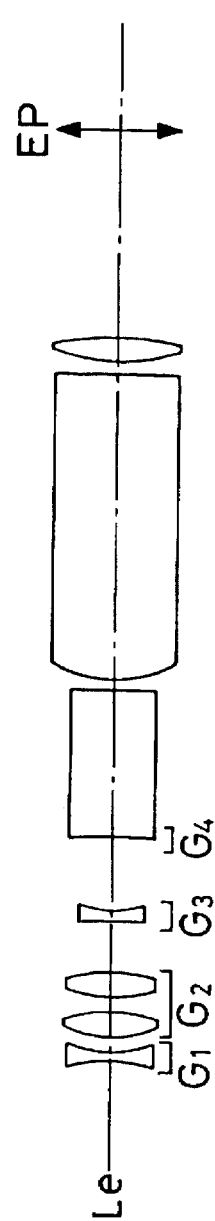
Figure 8A:
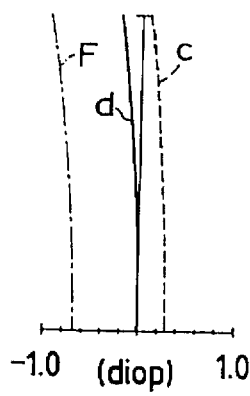
Figure 8B:
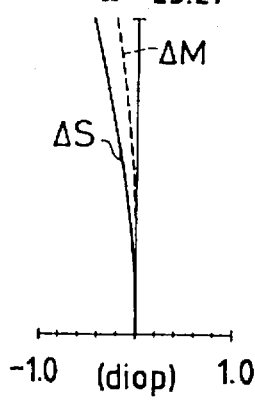
Figure 8C:
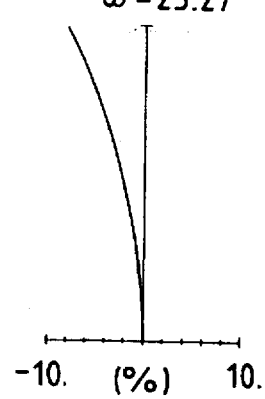
Figure 9A:
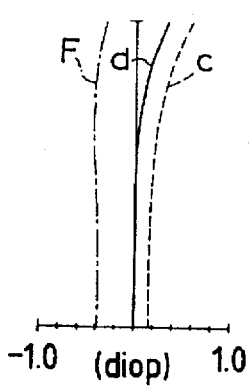
FIGS. 9A, 9B, and 9C are diagrams showing aberration characteristics at the middle position of the finder optical system of the second embodiment.
Figure 9B:
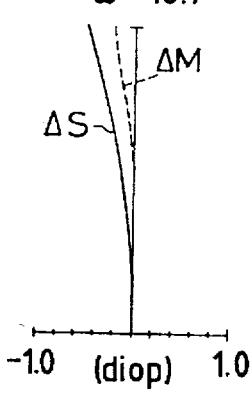
Figure 9C:
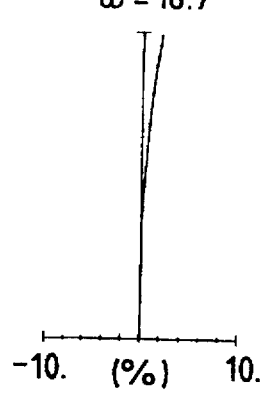
Figure 10A:
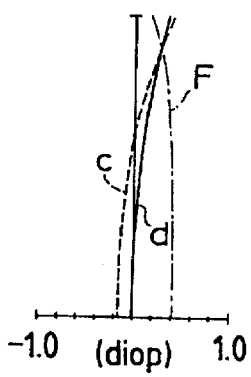
FIGS. 10A, 10B, and 10C are diagrams showing aberration characteristics at the telephoto position of the finder optical system of the second embodiment.
Figure 10B:
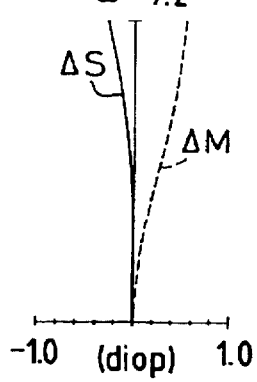
Figure 10C:
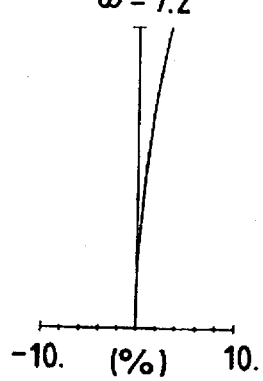

This embodiment, as shown in FIGS. 7A, 7B, and 7C, is such that the objective system includes the first lens unit G1 having a negative refracting power, the second lens unit G2 having a positive refracting power, the third lens unit G3 having a negative refracting power, and the fourth lens unit G4 having a negative refracting power. Each of the first, third, and fourth lens units G1, G3, and G4 is constructed with a single lens. The first and third lens units G1 and G3 are represented by lenses L1 and L4, respectively, and the fourth lens unit G4 is constructed integral with the first prism P$_1$ so that its entrance surface has a lens function. The second lens unit G2 is composed of two lenses which are represented by L2 and L3. Also, reference symbol L5 denotes the eyepiece. The image produced by the objective system is formed close to the entrance surface of the second prism P2, which plays the role of a field lens. The magnification change is made by moving the second and third lens units G2 and G3, and the first and fourth lens units G1 and G4 are fixed.

An example of numerical data in the optical system of the second embodiment is shown below. Also, FIGS. 8A–8C, 9A–9C, and 10A–10C show aberration characteristics of the optical system of the second embodiment.

Numerical Data $\omega = 25.27 - 7.2°, EP = 19.77, m = 0.4 - 1.31$

| | | | |
|---|---|---|---|
| $r_1 = -13.644$ (aspherical) | | | |
| | $d_1 = 1$ | $n_1 = 1.58423$ | $\nu_1 = 30.49$ |
| $r_2 = 9.2493$ | | | |
| | $d_2 = 11.15$ (wide-angle), 4.48 (middle), 1.37 (telephoto) | | |
| $r_3 = 8.252$ (aspherical) | | | |
| | $d_3 = 2.4$ | $n_3 = 1.52542$ | $\nu_3 = 55.78$ |
| $r_4 = -15.629$ | | | |
| | $d_4 = 1.32$ | | |
| $r_5 = 13.659$ | | | |
| | $d_5 = 2.27$ | $n_5 = 1.52542$ | $\nu_5 = 55.78$ |
| $r_6 = -18.088$ | | | |
| | $d_6 = 0.85$ (wide-angle), 1.99 (middle), 5.05 (telephoto) | | |
| $r_7 = -206.688$ (aspherical) | | | |
| | $d_7 = 1$ | $n_7 = 1.58423$ | $\nu_7 = 30.49$ |
| $r_8 = 7.8064$ | | | |
| | $d_8 = 1.52$ (wide-angle), 7.04 (middle), 7.1 (telephoto) | | |
| $r_9 = -85.47$ (aspherical) | | | |
| | $d_9 = 14.11$ | $n_9 = 1.52542$ | $\nu_9 = 55.78$ |
| $r_{10} = \infty$ | | | |
| | $d_{10} = 1$ | | |
| $r_{11} = 11.1556$ | | | |
| | $d_{11} = 29.5$ | $n_{11} = 1.52542$ | $\nu_{11} = 55.78$ |
| $r_{12} = \infty$ | | | |
| | $d_{12} = 1.23$ | | |
| $r_{13} = 15.865$ | | | |
| | $d_{13} = 2.1$ | $n_{13} = 1.52542$ | $\nu_{13} = 55.78$ |
| $r_{14} = -35.808$ (aspherical) | | | |

Aspherical Coefficients

First Surface

P=1,
E=−6.5579×10$^{-6}$, F=−6.7697×10$^{-7}$,
G=3.6744×10$^{-7}$, H=−7.7929×10$^{-9}$

Third Surface

P=1,
E=−3.882×10$^{-4}$, F=1.8834×10$^{-6}$,
G=−1.2252×10$^{-7}$, H=2.7435×10$^{-9}$

Seventh Surface

P=1,
E=−9.0161×10$^{-4}$, F=−1.4727×10$^{-5}$,
G=−9.6743×10$^{7}$, H=2.1504×10$^{-7}$

Ninth Surface

P=1,
E=2.3128×10$^{-4}$, F=−6.455×10$^{-6}$,
G=3.402×10$^{-6}$, H=−2.8334×10$^{-7}$

Fourteenth Surface

P=1,
E=7.1279×10$^{-5}$, F=−5.6787×10$^{-7}$,
G=2.0894×10$^{-8}$, H=−2.0813×10$^{-10}$

Third Embodiment

Figure 11A:
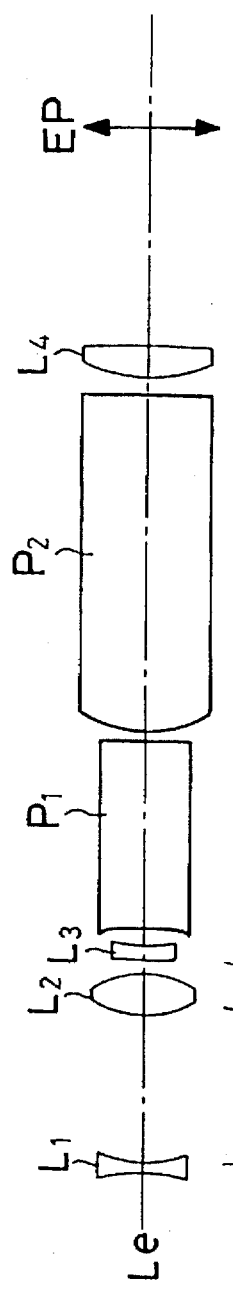
FIGS. 11A, 11B, and 11C are sectional views showing arrangements, developed along the optical axis, at wide-angle, middle, and telephoto positions, respectively, of the finder optical system of a third embodiment in the present invention.
Figure 11B:
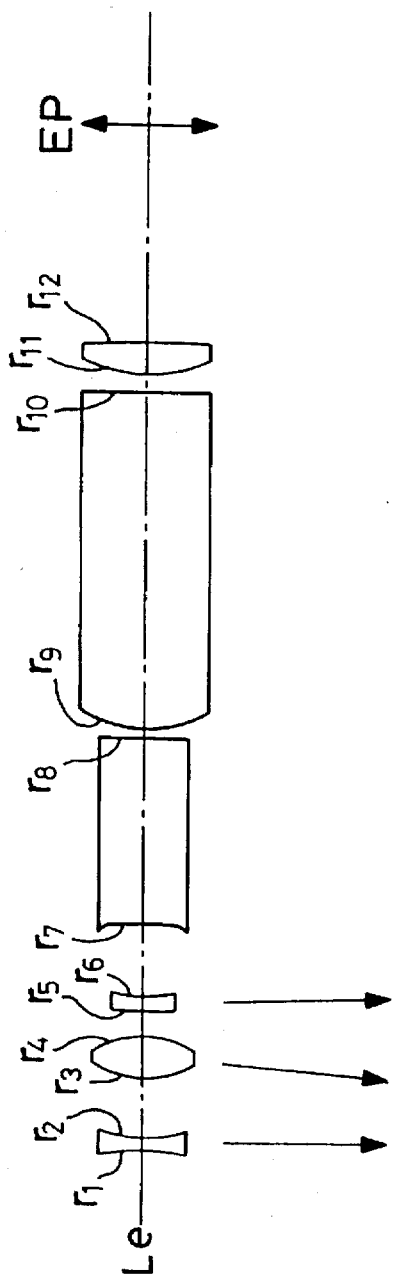
Figure 11C:
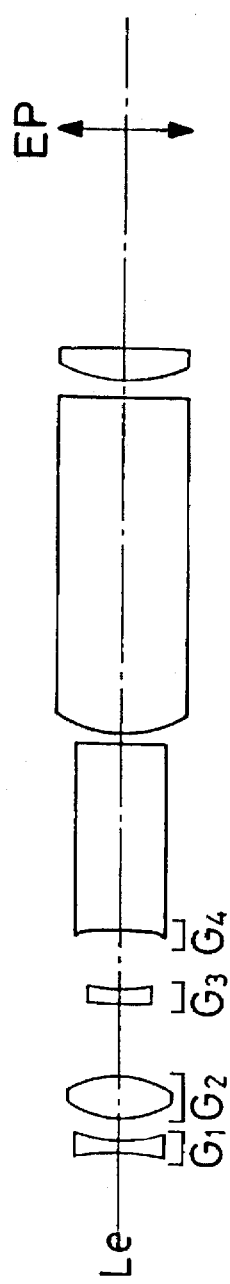
Figure 12A:
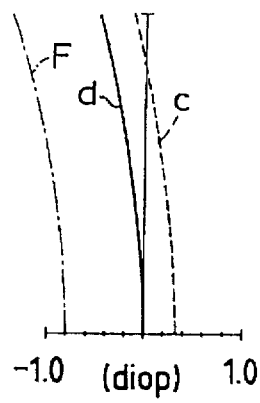
FIGS. 12A, 12B, and 12C are diagrams showing aberration characteristics at the wide-angle position of the finder optical system of the third embodiment.
Figure 12B:
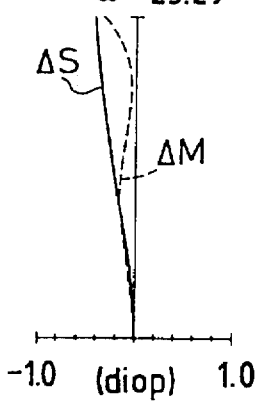
Figure 12C:
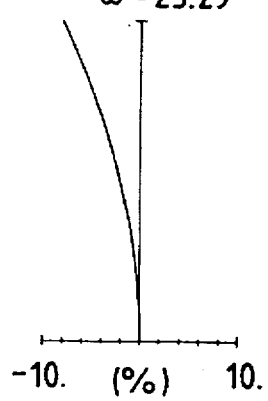
Figure 13A:
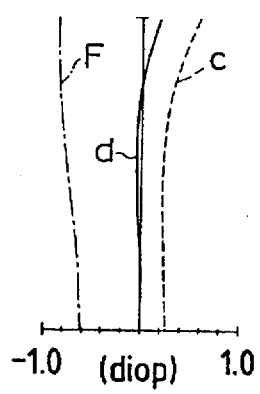
FIGS. 13A, 13B, and 13C are diagrams showing aberration characteristics at the middle position of the finder optical system of the third embodiment.
Figure 13B:
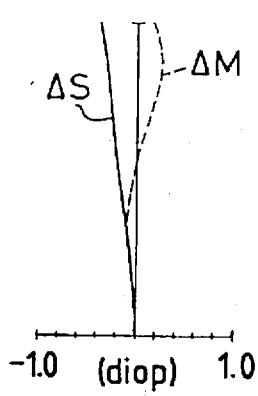
Figure 13C:
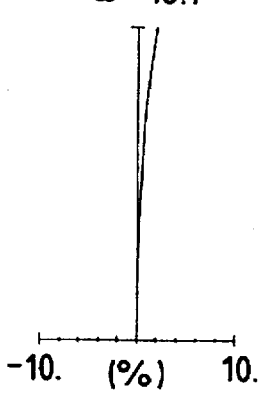
Figure 14A:
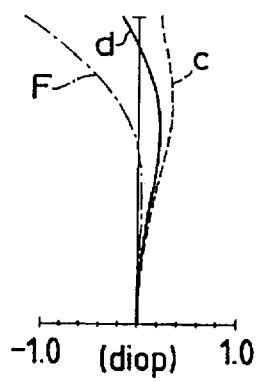
FIGS. 14A, 14B, and 14C are diagrams showing aberration characteristics at the telephoto position of the finder optical system of the third embodiment.
Figure 14B:
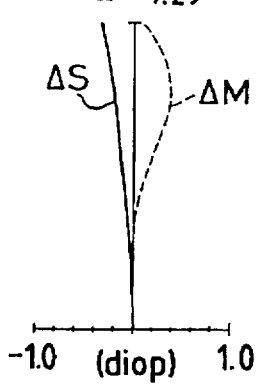
Figure 14C:
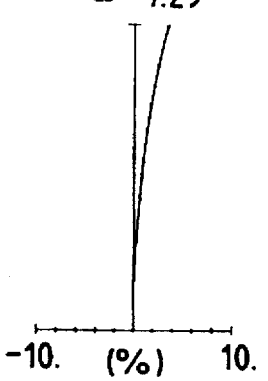

In this embodiment, as shown in FIGS. 11A, 11B, and 11C, the objective system includes the first lens unit G1 having a negative refracting power, the second lens unit G2 having a positive refracting power, the third lens unit G3 having a negative refracting power, and the fourth lens unit G4 having a negative refracting power. Each of these lens units is constructed with a single lens. The first, second, and third lens units G1, G2, and G3 are represented by lenses L1, L2, and L3, respectively, and the fourth lens unit G4 is constructed integral with the first prism P1 so that its entrance surface has a lens function. Also, reference symbol L4 denotes the eyepiece. The image produced by the objective system is formed close to the entrance surface of the second prism P2, which plays the role of a field lens. The magnification change is made by moving the first, second and third lens units G1, G2 and G3, and the fourth lens unit G4 is fixed.

An example of numerical data in the optical system of the third embodiment is shown below. Also, FIGS. 12A–12C, 13A–13C, and 14A–14C show aberration characteristics of the optical system of the third embodiment.

Numerical Data

| ω = 25.29 − 7.29°, EP = 19, m = 0.4 − 1.3 | | | |
|---|---|---|---|
| $r_1$ = −16.113 | | | |
| | $d_1$ = 1 | $n_1$ = 1.58423 | $v_1$ = 30.49 |
| $r_2$ = 8.969 | | | |
| | $d_2$ = 12.99 (wide-angle), 5.38 (middle), 2.06 (telephoto) | | |
| $r_3$ = 6.466 (aspherical) | | | |
| | $d_3$ = 3.62 | $n_3$ = 1.52542 | $v_3$ = 55.78 |
| $r_4$ = −8.138 (aspherical) | | | |
| | $d_4$ = 1.4 (wide-angle), 2.46 (middle), 6.59 (telephoto) | | |
| $r_5$ = 145.97 | | | |
| | $d_5$ = 1.23 | $n_5$ = 1.58423 | $v_5$ = 30.49 |
| $r_6$ = 11.317 (aspherical) | | | |
| | $d_6$ = 1.63 (wide-angle), 6.47 (middle), 5.24 (telephoto) | | |
| $r_7$ = −23.911 (aspherical) | | | |
| | $d_7$ = 16.5 | $n_7$ = 1.58542 | $v_7$ = 55.78 |
| $r_8$ = ∞ | | | |
| | $d_8$ = 1 | | |
| $r_9$ = 10.135 | | | |
| | $d_9$ = 29.5 | $n_9$ = 1.52542 | $v_9$ = 55.78 |
| $r_{10}$ = ∞ | | | |
| | $d_{10}$ = 1.39 | | |
| $r_{11}$ = 13.025 | | | |
| | $d_{11}$ = 2.82 | $n_{11}$ = 1.52542 | $v_{11}$ = 55.78 |
| $r_{12}$ = −72.228 (aspherical) | | | |

Aspherical Coefficients

Third Surface

P=1
E=−7.0704×10$^{-4}$, F=−6.1546×10$^{-6}$,
G=−3.5608×10$^{-9}$, H=6.9153×10$^{-9}$

Fourth Surface

P=1
E=4.3127×10$^{-4}$, F=−2.0643×10$^{-6}$,
G=−2.1029×10$^{-7}$, H=9.8903×10$^{-9}$

Sixth Surface

P=1
E=6.214×10$^{-4}$, F=5.0089×10$^{-5}$,
G=−1.2276×10$^{-6}$, H=3.9443×10$^{-7}$

Seventh Surface

P=1
E=2.7347×10$^{-4}$, F=−3.7465×10$^{-5}$,
G=1.4251×10$^{-5}$, H=−1.4453×10$^{-6}$

Twelfth Surface

P=1
E=8.4959×10$^{-5}$, F=2.9428×10$^{-6}$,
G=−2.0828×10$^{-7}$, H=4.2428×10$^{-9}$

Fourth Embodiment

Figure 15A:
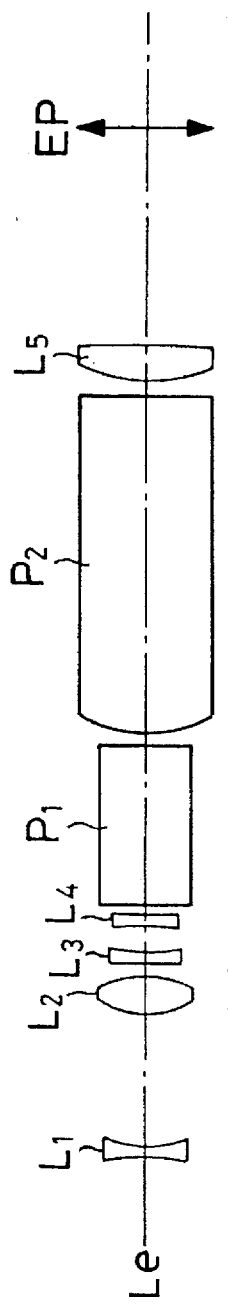
FIGS. 15A, 15B, and 15C are sectional views showing arrangements, developed along the optical axis, at wide-angle, middle, and telephoto positions, respectively, of the finder optical system of a fourth embodiment In the present invention.
Figure 15B:
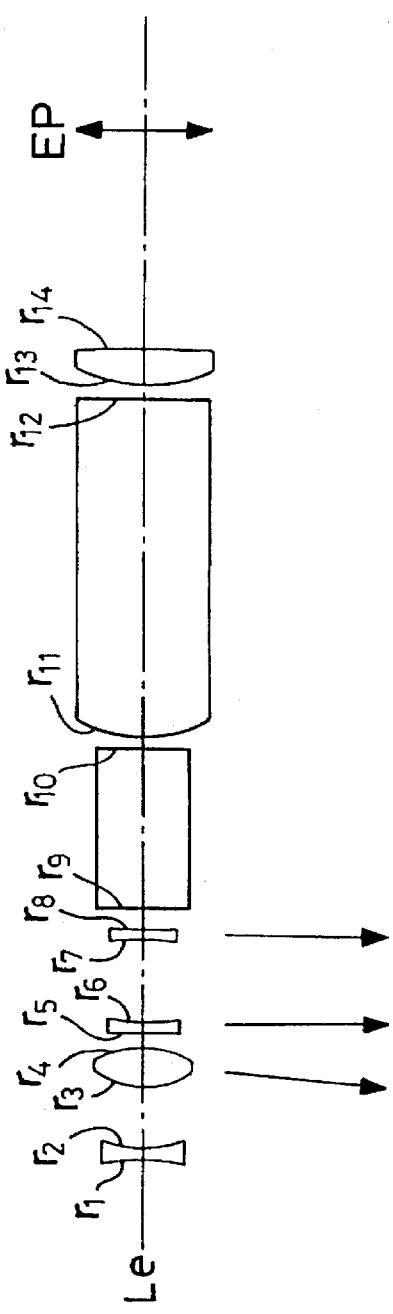
Figure 15C:
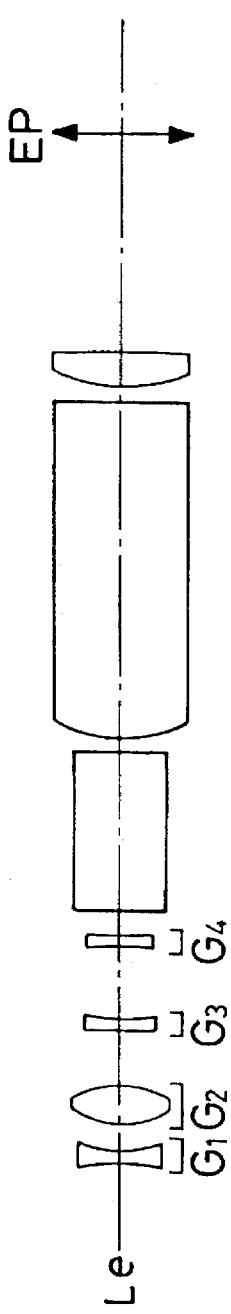
Figure 16A:
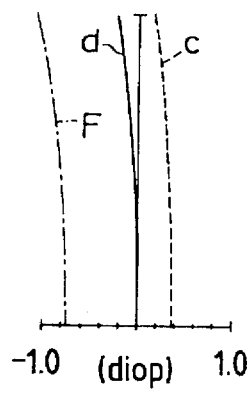
FIGS. 16A, 16B, and 16C are diagrams showing aberration characteristics at the wide-angle position of the finder optical system of the fourth embodiment.
Figure 16B:
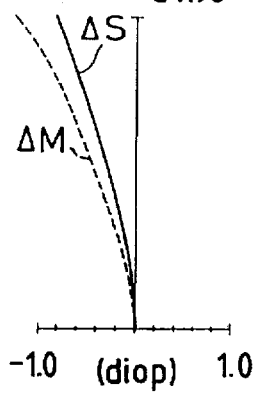
Figure 16C:
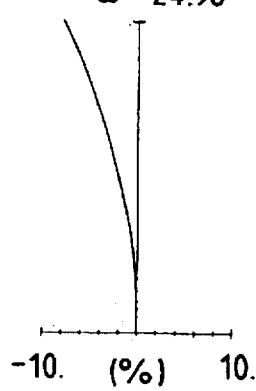
Figure 17A:
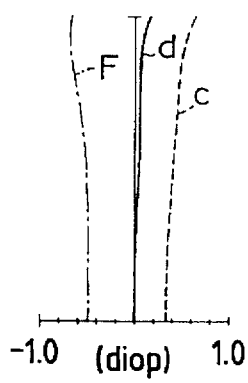
FIGS. 17A, 17B, and 17C are diagrams showing aberration characteristics at the middle position of the finder optical system of the fourth embodiment.
Figure 17B:
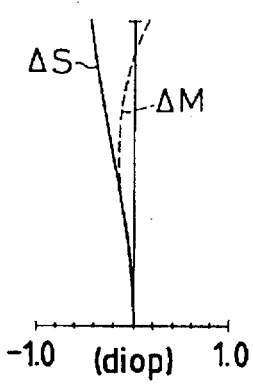
Figure 17C:
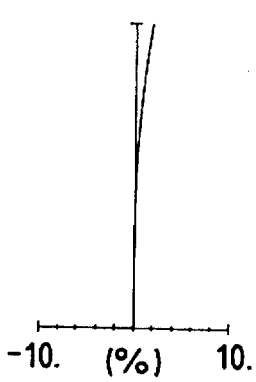
Figure 18A:
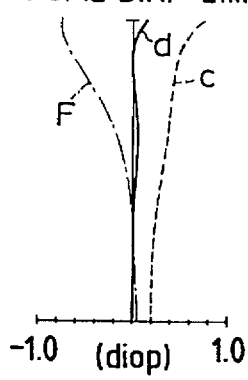
FIGS. 18A, 18B, and 18C are diagrams showing aberration characteristics at the telephoto position of the finder optical system of the fourth embodiment.
Figure 18B:
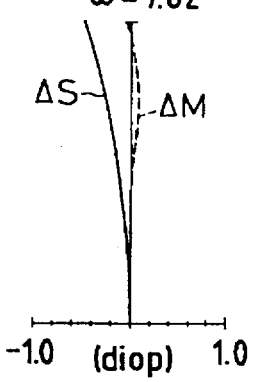
Figure 18C:
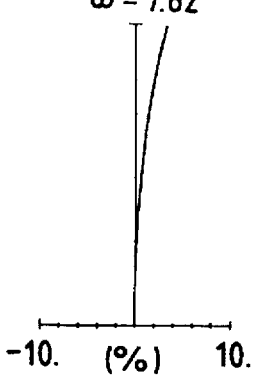

This embodiment, as shown in FIGS. 15A, 15B, and 15C, is such that the objective system includes the first lens unit G1 having a negative refracting power, the second lens unit G2 having a positive refracting power, the third lens unit G3 having a negative refracting power, and the fourth lens unit 64 having a negative refracting power. The first, second, third, and fourth lens units G1, G2, G3, and G4 are each constructed with a single lens and are represented by lenses L1, L2, L3, and L4, respectively. The first prism P1 for inverting the image, having no lens function, is placed behind the fourth lens unit G4. Also, reference symbol L5 denotes the eyepiece. The image produced by the objective system is formed close to the entrance surface of the second prism P2, which plays the role of a field lens. The magnification change is made by moving the second, third, and fourth lens units G2, G3, and G4, and the first lens unit G1 is fixed.

An example of numerical data in the optical system of the fourth embodiment is shown below. Also, FIGS. 16A–16C, 17A–17C, and 18A–18C show aberration characteristics of the optical system of the fourth embodiment.

Numerical Data

| ω = 24.98 − 7.82°, EP = 18.97, m = 0.4 − 1.2 | | | |
|---|---|---|---|
| $r_1$ = −14.299 (aspherical) | | | |
| | $d_1$ = 1 | $n_1$ = 1.58423 | $v_1$ = 30.49 |
| $r_2$ = 8.388 | | | |
| | $d_2$ = 11.51 (wide-angle), 5.45 (middle), 2.56 (telephoto) | | |
| $r_3$ = 6.291 (aspherical) | | | |
| | $d_3$ = 3.19 | $n_3$ = 1.5254 | $v_3$ = 56.25 |
| $r_4$ = −7.764 (aspherical) | | | |
| | $d_4$ = 1.04 (wide-angle), 1.39 (middle), 4.87 (telephoto) | | |
| $r_5$ = −240.483 | | | |

-continued $\omega = 24.98 - 7.82°$, EP = 18.97, m = 0.4 - 1.2

| | $d_5 =$ | 1.01 | $n_5 = 1.58423$ | $v_5 = 30.49$ |
|---|---|---|---|---|
| $r_6 = 15.811$ (aspherical) | | | | |
| | $d_6 =$ | 2.32 (wide-angle), 7.16 (middle), 6.34 (telephoto) | | |
| $r_7 = -27.856$ (aspherical) | | | | |
| | $d_7 =$ | 1 | $n_7 = 1.5254$ | $v_7 = 56.25$ |
| $r_8 = 72.853$ | | | | |
| | $d_8 =$ | 0.9 (wide-angle), 1.78 (middle), 2.02 (telephoto) | | |
| $r_9 = \infty$ | | | | |
| | $d_9 =$ | 14.07 | $n_9 = 1.52542$ | $v_9 = 55.78$ |
| $r_{10} = \infty$ | | | | |
| | $d_{10} =$ | 1 | | |
| $r_{11} = 10.828$ | | | | |
| | $d_{11} =$ | 29.5 | $n_{11} = 1.5254$ | $v_{11} = 56.25$ |
| $r_{12} = \infty$ | | | | |
| | $d_{12} =$ | 1.38 | | |
| $r_{13} = 12.864$ | | | | |
| | $d_{13} =$ | 3 | $n_{13} = 1.52542$ | $v_{13} = 55.78$ |
| $r_{14} = -77.145$ (aspherical) | | | | |

Aspherical Coefficients

First Surface

P=1,
B=$1.9825 \times 10^{-4}$, F=$-1.2639 \times 10^{-5}$,
G=$5.0562 \times 10^{-7}$, H=$3.6103 \times 10^{-8}$ Third Surface P=1,
B=$-8.1485 \times 10^{-4}$, F=$-9.3362 \times 10^{-6}$,
G=$3.6077 \times 10^{7}$, H=$-1.9098 \times 10^{-8}$ Fourth Surface P=1,
B=$5.3646 \times 10^{-4}$, F=$-6.5469 \times 10^{-6}$,
G=$5.459 \times 10^{-7}$, H=$-1.2488 \times 10^{-8}$ Sixth Surface P=1,
B=$3.0632 \times 10^{-4}$, F=$2.1447 \times 10^{-6}$,
G=$8.6402 \times 10^{-8}$, H=$1.6536 \times 10^{-7}$ Seventh Surface P=1,
B=$4.0208 \times 10^{-5}$, F=$-1.1078 \times 10^{-4}$,
G=$1.3655 \times 10^{-5}$, H=$-8.0948 \times 10^{-7}$ Fourteenth Surface P=1,
B=$1.0734 \times 10^{-4}$, F=$-1.9914 \times 10^{-7}$,
G=$-1.8102 \times 10^{-8}$, H=$8.7507 \times 10^{-10}$

What is claimed is:

1. A real image mode variable magnification finder optical system comprising:

a finder objective for forming an optical path different from a photographic objective;

image erecting means for erecting an image formed by said finder objective; and an eyepiece having a positive refracting power, said finder objective including, in order from an object side, a first lens unit having a negative refracting power, a second lens unit having a positive refracting power, a third lens unit having a negative refracting power, and a fourth lens unit having a negative refracting power, so that, at least, said second lens unit and said third lens unit are movable along an optical axis to change spaces among respective lens units from said first lens unit to said fourth lens unit.

2. A real image mode variable magnification finder optical system according to claim 1, wherein each of lens units of said finder objective includes a single lens.

3. A real image mode variable magnification finder optical system according to claim 1, wherein said second lens unit of said finder objective includes two lenses.

4. A real image mode variable magnification finder optical system according to claims 2 or 3, wherein one of said first lens unit and said second lens unit of said finder objective has at least one aspherical surface.

5. A real image mode variable magnification finder optical system according to claim 1, wherein said finder objective includes a part of said image inverting means.

6. A real image mode variable magnification finder optical system according to claim 1, wherein at least two lens units of said respective lens units of said finder objective are moved to thereby change a magnification and compensate for a diopter.

7. A real image mode variable magnification finder optical system according to claim 1, wherein when a magnification of said finder optical system is changed between a wide-angle position and a telephoto position thereof, said first lens unit and said fourth lens unit are fixed on the optical axis, and said second lens unit and said third lens unit are moved along the optical axis.

8. A real image mode variable magnification finder optical system according to claim 1, wherein when a magnification of said finder optical system is changed between a wide-angle position and a telephoto position thereof, said first lens unit is fixed, and said second lens unit, said third lens unit, and said fourth lens unit are moved along the optical axis.

9. A real image mode variable magnification finder optical system according to claim 1, wherein when a magnification of said finder optical system is changed between a wide-angle position and a telephoto position thereof, said fourth lens unit is fixed, and said first lens unit, said second lens unit, and said third lens unit are moved along the optical axis.

10. A real image mode variable magnification finder optical system according to claim 1, wherein said first lens unit has at least one aspherical surface.

11. A real image mode variable magnification finder optical system according to claim 1, wherein said second lens unit has at least one aspherical surface.

12. A real image mode variable magnification finder optical system according to claim 1, wherein said first lens unit includes a biconcave lens.

13. A real image mode variable magnification finder optical system according to claim 1, wherein said second lens unit includes a biconvex lens.

* * * * *